UNITED STATES PATENT OFFICE.

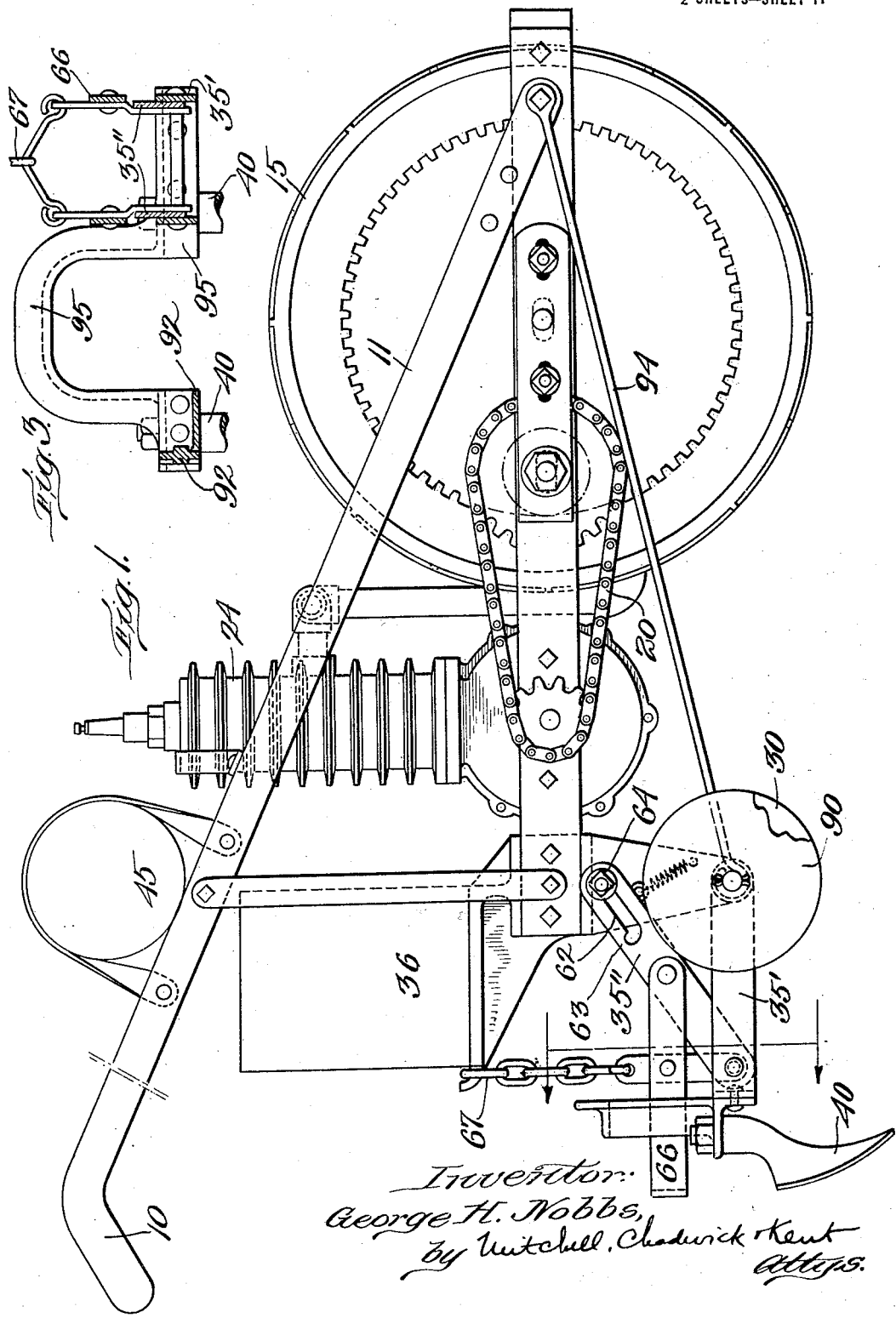

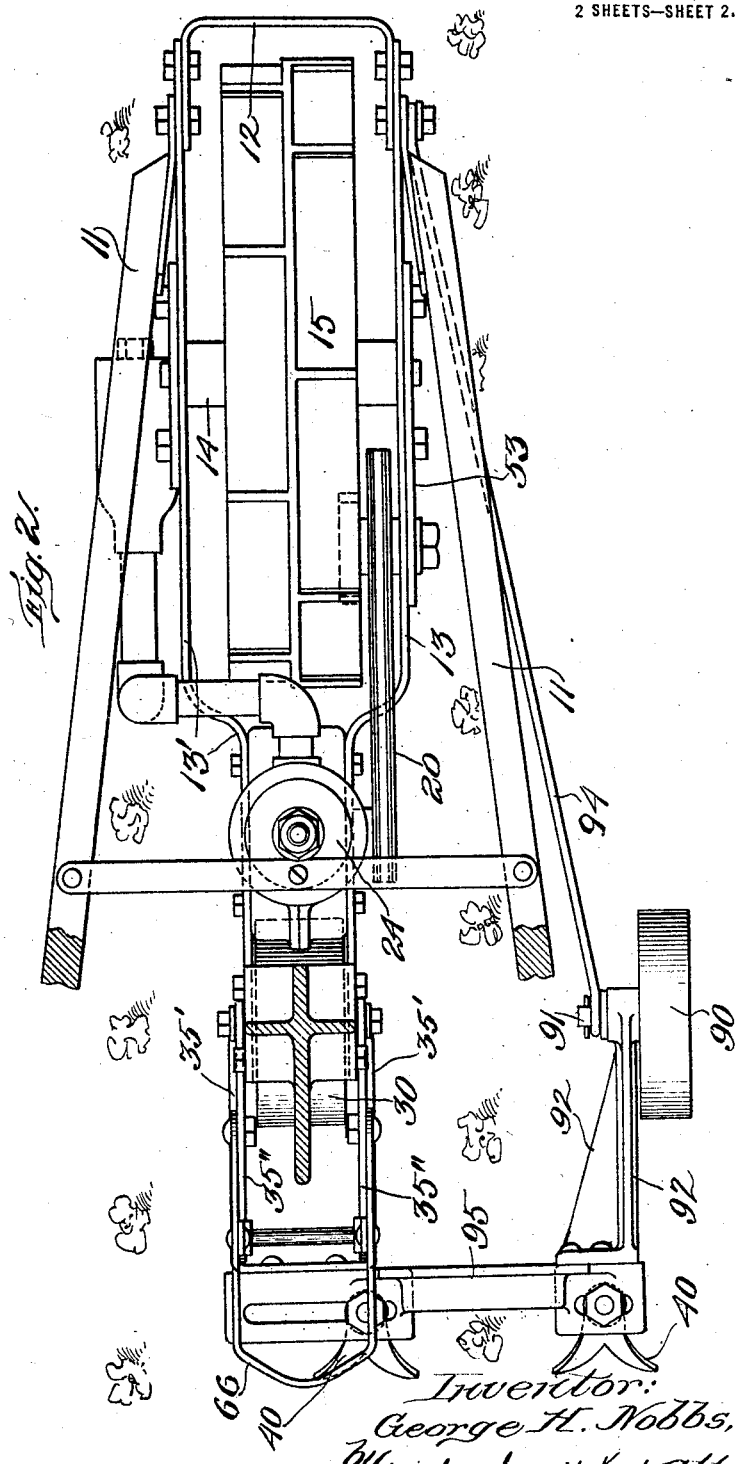

GEORGE H. NOBBS, OF WATERTOWN, MASSACHUSETTS.

TRACTOR.

1,406,754.  Specification of Letters Patent.  Patented Feb. 14, 1922.

Application filed October 31, 1919. Serial No. 334,804.

*To all whom it may concern:*

Be it known that I, GEORGE H. NOBBS, a citizen of the United States, residing at Watertown, in the county of Middlesex and State of Massachusetts, have invented certain new and useful Improvements in Tractors, of which the following is a specification.

This invention relates to improvements in tractors. More especially it relates to attachments by which a cultivator or other garden tool can be operated on both sides of a row although the tractive force is applied by a single wheel, which necessarily runs at one side of a row. The tractor may be of the general type in which a frame having bifurcated handles, projecting backward and arranged to be grasped by a man walking behind, is adapted to manipulate a single motor-driven traction wheel. In such apparatus, an auxiliary foot or wheel, arranged in tandem with the traction wheel, ordinarily steadies the frame, aids in carrying its weight, and is capable of serving as a fulcrum for the lifting of the traction wheel from the ground by the operator at will; and the working tool is drawn behind in the track of the two wheels. The object of the present invention is to render available the single-wheel tractor for working on both sides of a row, with a great economy of weight, as compared with four-wheel tractors and with much simplification of apparatus, mechanism, etc., but with the superiority of handling and control which is incidental to the one-wheel tractor. These objects are accomplished by adding to the one-wheel tractor a side rear wheel, held by a transverse beam at a proper distance on the other side of the row which is to be cultivated, and set far enough back, from the front of the apparatus, to be drawn forward by a simple metallic tie from the front. This tie, the stout rear transverse beam, and the tractor frame, together constitute a triangle whose rear strut may be a draw bar carrying or drawing the cultivating tools, or such other apparatus as may be desired.

Although herein illustrated only as it may be applied for a cultivator, the invention is applicable for other uses, suitable attachments and adaptations being made. The tractor illustrated is of the general style disclosed and claimed in my co-pending application for patent Serial No. 319,379. It is intended that the present patent shall cover, by suitable expression in the appended claims, whatever features of patentable novelty exist in the invention disclosed, other than those disclosed in my said other application.

An embodiment of the invention is illustrated in the accompanying drawings, in which:

Figure 1 is a side elevation of apparatus embodying the invention.

Figure 2 is a plan, and Fig. 3 is an elevation of a detail, in section on line 3—3 of Fig. 1.

Referring to the drawings:

The reference numeral 10 indicates handles conveniently spread, as in a plow or other garden implement, from which handles the main fore and aft inclined members 11 of a frame converge forward and downward to a narrow forward yoke 12, to which are joined also the forward ends of the horizontal fore and aft members 13, 13'. The latter carry the axle 14 of a traction wheel 15, set close behind the yoke 12. The frame is completed by upright and horizontal crossbars and is further supported by a wheel 30 arranged tandem with the traction wheel, at a little distance behind it but forward of the handles 10, so that the act of the operator in depressing the handles swings the whole apparatus around this rear supporting wheel 30 and raises the traction wheel from the ground, stopping the traction. An engine 24, auxiliary apparatus, such as a gasoline tank 45, battery box 36, transmission chain 20, and incidental gearing are mounted on the frame. This structure may be as set forth and claimed in my co-pending application for patent Serial No. 319,379, or it may embody suitable variations of or departures from the construction there shown. To accomplish the particular object of the present invention, there is added to such a tandem wheel tractor an outrigged pivot for a traction yoke, comprising an axle 91 in the axial line of the axle of the wheel 30 on which is a supporting wheel 90 adapted to run on the ground.

The axle is a mere stub and need not be longer than is sufficient to hold the wheel 90. It serves the combined function of a point of support for a line of traction and a pivot for the tool holder and tools at the rear. The said line of traction runs outward and backward from the forward end 12 of the frame through a slightly oblique tie rod 94 to the axle 91, whence it continues parallel to the frame through the stiff traction bar 92 back to the outward end of the compound yoke and draw bar 95. This draw bar has its inward end attached to the traction yoke 35′ in the rear of the tandem wheels. Said traction yoke 35′ is pivoted on the axle of the rear tandem wheel 30; and the traction bar 92 is pivoted on the same axis at the axle of the wheel 90. The bar itself is adapted for the attachment of any tool or other apparatus which is to be drawn by the tractor. It has an arched central portion, rising from the level of the rear of the traction yoke 35′ and of the bar 92 to any desired elevation, thereby to bridge without touching a row of growing plants, as shown in Figures 2 and 3. It maintains the outrigged pivot 91 and the wheel 90 so spaced from the main body of the tractor as to run clear of such plants, on the other side of the row. Under these circumstances, the traction from the forward end of the frame carries forward the pivot 91 with a draft transmitted through the rod 94 in a direction which is not much removed from straight fore and aft; and the rear bars 92 and 95 maintain that pivot rigidly at the predetermined distance to one side of the frame and tandem wheels. Any desired tool 40 may be set in the draw bar, cultivator blades being illustrated, to work in the rear of the tandem wheels and in the rear of the outrigged axle 91. These may be manipulated together to and from the ground, by swinging the major yoke, composed of the traction yoke 35′ the traction bar 92 and the draw bar 95 joining them, about the coinciding axis of the rear supporting wheel 30 and outrigged wheel 90. The drawing illustrates as a device auxiliary to this purpose, side tie bars 35″ one of which has a slot 62 in which a pin or bolt 64 limits the descent of the traction yoke 35′ and draw bar, as illustrated in Figure 1, if not limited at a higher level by the chain 67. The operator can lift the draw bar by lifting a foot lever 66; or preferably, by simply dipping the handles 10. When he executes the latter operation, the tractor frame tips around the axle of the wheels 30 and 90, with the pin 64 sliding along the slot 62 and finally engaging in a notch 63 therein; and then, as the handles rise from the dip, the pin 64 by raising the tie bars 35″ lifts the tool 40 from the ground.

When arranged as illustrated, with a wheel 90 outrigged on one side only, it is possible by tipping the apparatus a little toward the other side to raise that wheel clear of the ground, and so to move the tractor solely on the tandem wheels, or solely on either of them, with resulting great facility in manipulating the apparatus, as by turning in place, or on a very short radius. However, an arrangement similar to that portrayed on the right side might be made on the left side also, extending the traction bar 95 over the row at the left and thus working in three furrows at once, i. e. in the spaces between four rows of growing crops.

I claim as my invention:—

1. A vehicle having in combination a frame with rear guiding handles; a single wheel supporting it; a second support arranged in tandem with said wheel; a stiff draw bar adapted for connection of earth working elements extending outward laterally from back of the rear of these supports; an axle and wheel outrigged even with the rear support; and ties attaching the axle to the forward end of the frame, and to the outward end of the draw bar.

2. A vehicle having in combination a frame with rear guiding handles; a single wheel supporting it; a second support arranged in tandem with said wheel; a stiff draw bar adapted for connection of earth working elements extending outward laterally from back of the rear of these supports; an axle and wheel outrigged even with the rear support; and ties attaching the axle to the forward end of the frame, and to the outward end of the draw bar; the draw bar being carried close to the ground, and having a raised portion between its points of attachment, adapted to vault a garden row.

3. A vehicle having in combination a frame with rear guiding handles; a single wheel supporting it; a second support arranged in tandem with said wheel; a stiff draw bar adapted for connection of earth working elements extending outward laterally from back of the rear of these supports; an axle and wheel outrigged even with the rear support; and ties attaching the axle to the forward end of the frame, and to the outward end of the draw bar; the draw bar being mounted to swing up and down around the axis of the rear support, to raise and lower tools.

4. A vehicle having in combination a frame with rear guiding handles; a forward single wheel thereon; a rear tandem wheel; a stiff draw bar adapted for connection of earth working elements extending outward laterally from back of the rear wheel; an axle and wheel outrigged on the axis of the rear wheel; and ties attaching the axle to the forward end of the frame and to the outward end of the draw bar.

5. A vehicle having in combination a frame with rear guiding handles; a single wheel; a stiff draw bar adapted for connection of earth working elements extending outward laterally from the rear of the traction wheel; a tie extending outward obliquely backward; and an outward wheel supporting their outward ends.

Signed at Boston, Mass., this thirtieth day of October, 1919.

GEORGE H. NOBBS.